(12) United States Patent
Saint-Michel

(10) Patent No.: US 11,081,944 B2
(45) Date of Patent: Aug. 3, 2021

(54) WOUND ROTOR OR STATOR AND METHOD FOR MANUFACTURING SAME

(71) Applicant: MOTEURS LEROY-SOMER, Angouleme (FR)

(72) Inventor: Jacques Saint-Michel, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 45 days.

(21) Appl. No.: 16/285,508

(22) Filed: Feb. 26, 2019

(65) Prior Publication Data

US 2019/0273423 A1  Sep. 5, 2019

(30) Foreign Application Priority Data

Mar. 1, 2018  (FR) ...................................... 1851808

(51) Int. Cl.

| | |
|---|---|
| *H02K 15/06* | (2006.01) |
| *H02K 3/18* | (2006.01) |
| *H02K 1/14* | (2006.01) |
| *H02K 1/24* | (2006.01) |
| *H02K 9/10* | (2006.01) |
| *H02K 15/095* | (2006.01) |

(Continued)

(52) U.S. Cl.
CPC ............. *H02K 15/062* (2013.01); *H02K 1/14* (2013.01); *H02K 1/24* (2013.01); *H02K 3/18* (2013.01); *H02K 3/24* (2013.01); *H02K 9/10* (2013.01); *H02K 15/095* (2013.01); *H02K 1/20* (2013.01); *H02K 1/32* (2013.01); *H02K 15/0031* (2013.01); *H02K 15/066* (2013.01)

(58) Field of Classification Search
CPC ............. H02K 15/062; H02K 15/0031; H02K 15/066; H02K 15/06; H02K 15/08; H02K 15/085; H02K 15/09; H02K 15/095; H02K 1/14; H02K 1/24; H02K 1/20; H02K 1/32; H02K 9/10; H02K 3/18; H02K 3/24
USPC .............................................. 310/52; 29/605
See application file for complete search history.

(56) References Cited

U.S. PATENT DOCUMENTS

| 4,340,186 A | 7/1982 | Shimada et al. |
| 2002/0093263 A1* | 7/2002 | Amrhein ................ H02K 21/02 |
| | | 310/90.5 |

(Continued)

FOREIGN PATENT DOCUMENTS

| EP | 1324471 A1 | 7/2003 |
| EP | 1638190 A1 | 3/2006 |

*Primary Examiner* — Michael Andrews
(74) *Attorney, Agent, or Firm* — Shumaker, Loop & Kendrick, LLP

(57) ABSTRACT

A method for manufacturing a wound rotor or stator having more than four poles, preferably a rotor, the rotor or stator having teeth provided with pole shoes. The method includes the following steps, for each pole: (a) producing a partial winding by winding at least one conductor over the portion of the tooth of this pole extending axially along this pole between the pole shoes of this pole and a plane ($P_{min}$) at right angles to the axis of the pole and tangential to a pole shoe of an adjacent pole, (b) pushing back the duly produced partial winding towards the base of the tooth, and freeing said portion of the tooth having been used for the winding, and (c) repeating step (a) to produce another partial winding on the duly released portion of tooth.

12 Claims, 2 Drawing Sheets

(51) Int. Cl.
  *H02K 3/24*   (2006.01)
  *H02K 1/20*   (2006.01)
  *H02K 1/32*   (2006.01)
  *H02K 15/00*  (2006.01)

(56) References Cited

U.S. PATENT DOCUMENTS

2011/0001372 A1* 1/2011 Dutau .............. H02K 1/32
                                                310/65
2011/0198963 A1* 8/2011 Tang ............... H02K 15/085
                                                310/208
2013/0192057 A1* 8/2013 Koga ............... H02K 15/085
                                                29/596

* cited by examiner

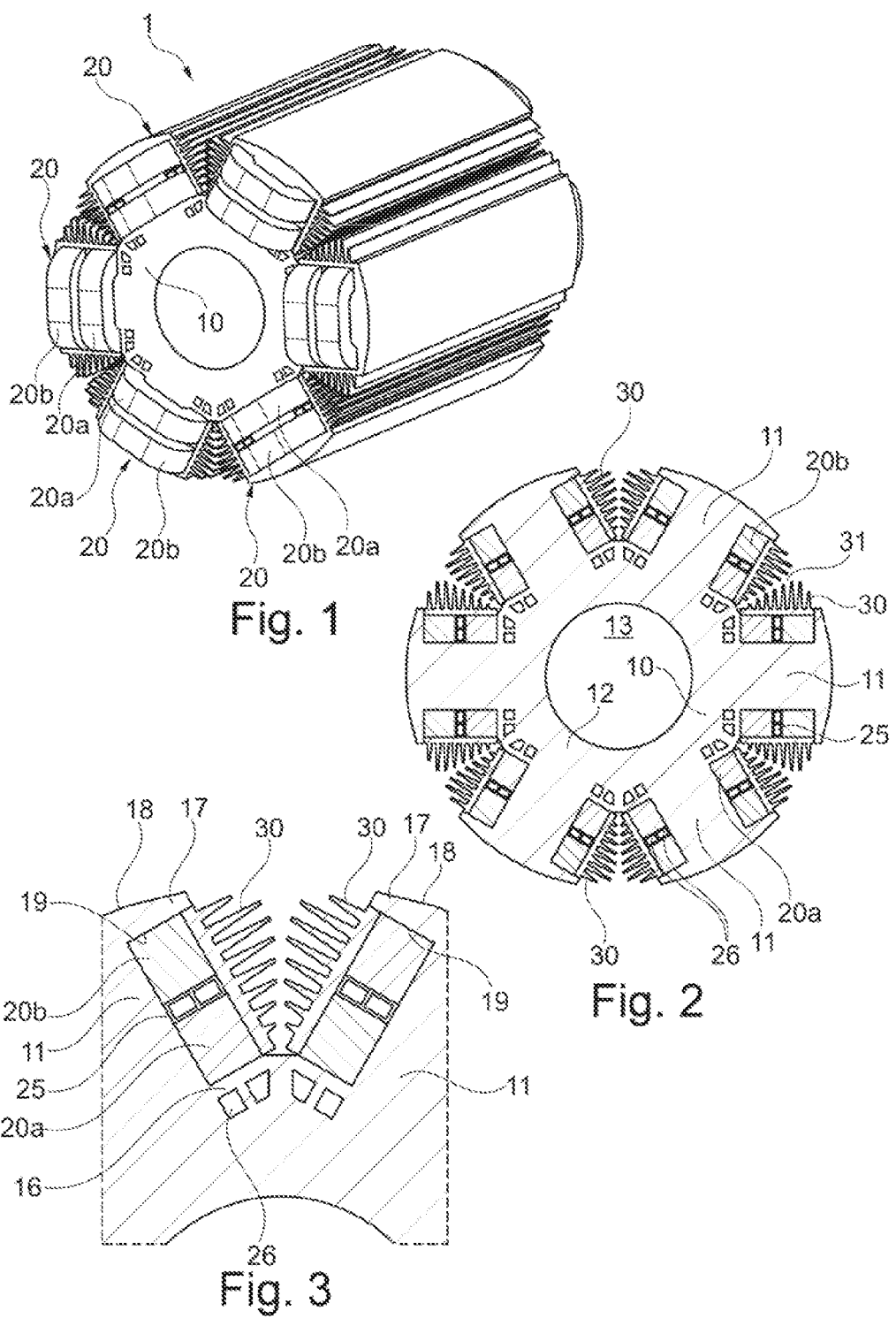

WOUND ROTOR OR STATOR AND METHOD FOR MANUFACTURING SAME

TECHNICAL FIELD

The present invention relates to the manufacturing of a wound rotor of a rotating electrical machine. The invention also applies to the production of a tooth-wound stator.

BACKGROUND

It is known practise to produce the wound rotors of motors with four poles using a winding machine comprising an arm arranged to wind a wire over the entire height of each tooth of the rotor.

Such a winding technique, called "fly winding", is particularly fast but reserved for machines with four poles, because, for a greater number of poles, the pole shoes of the teeth hamper the access to the teeth through their proximity.

Consequently, the rotors of machines with more than four poles are wound by using more complex techniques and the winding operation takes longer.

One example of a machine developed for winding a rotor with more than four poles is described in the U.S. Pat. No. 4,340,186.

There is a need to further improve the wound rotors and in particular simplify the manufacturing thereof and allow the winding operation to be performed at a higher rate, while obtaining a relatively high fill factor.

SUMMARY

The invention addresses this need through a method for manufacturing a wound rotor or stator having more than four poles, the rotor or stator comprising teeth provided with pole shoes, the method comprising the following steps, for each pole:

a) producing a partial winding by winding at least one conductor over the portion of the tooth of this pole extending axially along this pole between the pole shoes of this pole and a plane at right angles to the axis of the pole and tangential to a pole shoe of an adjacent pole, b) pushing back the duly produced partial winding towards the base of the tooth, and freeing said portion of the tooth having been used for the winding, c) repeating the step a) to produce another partial winding on the duly released portion of tooth.

The invention makes it possible to continue to benefit from the advantages of the fly winding technique despite the higher polarity of the rotor or stator.

The winding of each partial winding may be performed over the entire length of said portion, which corresponds to the entire winding window, or, as a variant, over only a part of this portion. In this case, not all the width of the winding window is used.

The step b) above is relatively simple to perform in an automated manner, and also does not slow down the rotor or stator manufacturing time.

The presence of partial windings may be exploited by placing a spacer between two partial windings of one and the same pole. This spacer may help to axially block the partial windings on the tooth and may contribute to the cooling of the rotor or stator, particularly when it is passed through by at least one channel for circulation of a coolant, in particular air.

The invention makes it possible to easily produce partial windings with ordered conductors, having a good fill factor.

The invention is particularly suited to rotors or stators having six poles, but may be applied to other machines having more than four poles. The rotor or stator may be wound pole after pole. As a variant, several poles are wound simultaneously, in particular the diametrically opposing poles.

Each pole may comprise only two partial windings. That may be the case in particular for the rotors or stators with six poles, for which the gap between the pole shoes makes it possible to produce relatively high partial windings.

Two partial windings may be produced with continuity of the conductor wire between the two. In other words, the conductor wire is not cut from one partial winding to the other. It is possible to wind the first partial winding, then, without cutting the wire, wind the second partial winding.

Another subject of the invention, according to another of its aspects, is a rotor or stator of a rotating electrical machine with more than four poles, preferably obtained by the implementation of the method according to the invention, as defined above, comprising:

teeth provided with pole shoes,
at least two partial windings arranged in the extension of one another on each tooth.

The rotor or stator may have exactly six teeth.

The rotor or stator may comprise a spacer between the two partial windings of each pole, even, in the case of more than two partial windings per pole, between at least two partial windings of this pole, or between all the partial windings of this pole.

The abovementioned spacer is preferably passed through by at least one ventilation channel.

The partial windings are preferably linked electrically in series.

A sheet of a material with a low friction coefficient may be interposed between the partial windings and the corresponding tooth. Such a sheet may facilitate the sliding of the partial winding when it is pushed back towards the base of the tooth during the manufacturing of the rotor or stator according to the method defined above.

Each pole may have exactly two partial windings, but the invention also encompasses variants with more than two partial windings per pole.

BRIEF DESCRIPTION OF THE DRAWINGS

The invention will be able to be better understood on reading the following detailed description of an exemplary nonlimiting implementation thereof, and on studying the attached drawing, in which:

FIG. 1 schematically represents, in perspective, an example of a rotor according to the invention, FIG. 2 is a cross section of the rotor of FIG. 1, FIG. 3 represents a detail of FIG. 2.

DETAILED DESCRIPTION

Figure 4:
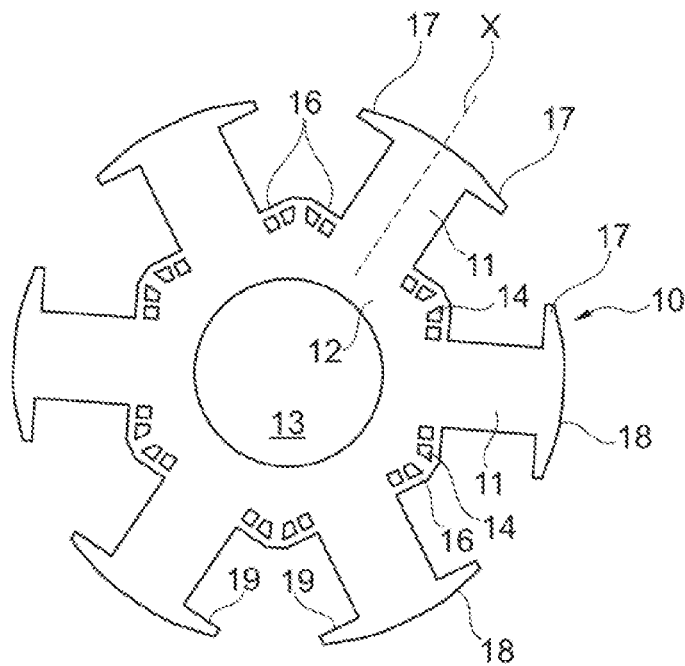
FIG. 4 represents the core of the rotor in isolation, and FIGS. 5A, 5B, 5C, and 5D provide various illustrations of the rotor winding method.

The rotor 1 according to the invention represented in the figures comprises a magnetic core 10, called armature, which may be formed by a bundle of superposed magnetic plates.

This magnetic core 10 comprises teeth 11 linked at their base by an annular part 12 provided with a central aperture 13 for mounting a shaft, which is not represented.

In the example considered, the rotor 1 has six poles and comprises six teeth 11.

Ventilation channels 14 may be produced between the teeth 11, as illustrated. These channels 14 may be formed between the annular part 12 and a partition 16 oriented at right angles to the longitudinal axis X of the adjoining tooth 11.

In the example illustrated, each tooth 11 has, at its base, two channels 14 on each side, it being understood that other arrangements are possible, without ventilation channels, or with a different number of channels.

Each tooth 11 has, at its radially outermost end, two pole shoes 17, also called pole tips.

The radially outer edge 18 of each tooth is preferably circular, centred on the axis of rotation of the rotor. The radially inner faces 19 of the pole shoes 17 are preferably, as illustrated, at right angles to the longitudinal axis X of the corresponding tooth 11.

Each tooth 11 bears a pole winding 20 formed by two partial windings 20a and 20b linked electrically in series and linked electrically to the other poles, generally in series, or, as a variant, with two parallel channels, and in this case, preferentially in series with the poles of the same name.

The radially innermost winding 20a bears on the partitions 16 situated at the base of the corresponding tooth 11.

The radially outermost winding 20b bears on the faces 19 of the pole shoes 17.

If necessary, a sheet of electrically insulating material, not represented, is interposed between the magnetic core and each partial winding.

Spacers 25 may be inserted, as illustrated, between the partial windings 20a and 20b of one and the same pole, to hold the windings 20a and 20b in place.

These spacers 25 are preferably produced in a material that is a good conductor of heat such as aluminium and are passed through by at least one ventilation channel, for example two channels 26 as illustrated.

Heat sinks 30 with fins may be fixed against the partial windings 20a and 20b in the inter-pole space 31, as illustrated.

These sinks 30 may bear by their radially outermost longitudinal edge against the face 19 of the adjacent pole shoe 17, and extend radially inwards substantially to the adjacent partition 16.

The fins of the sinks 30 may be of variable height so that the interval formed between two sinks 30 housed in one and the same inter-pole space 31 is substantially of constant width, as illustrated.

The method for manufacturing the rotor 1 will now be described with reference to FIGS. 5A to 5D.

Figure 5B:
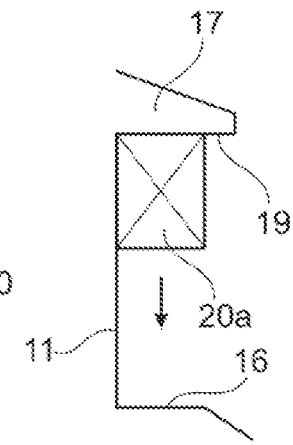
Figure 5C:
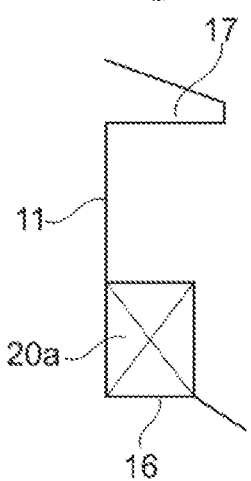
Figure 5A:
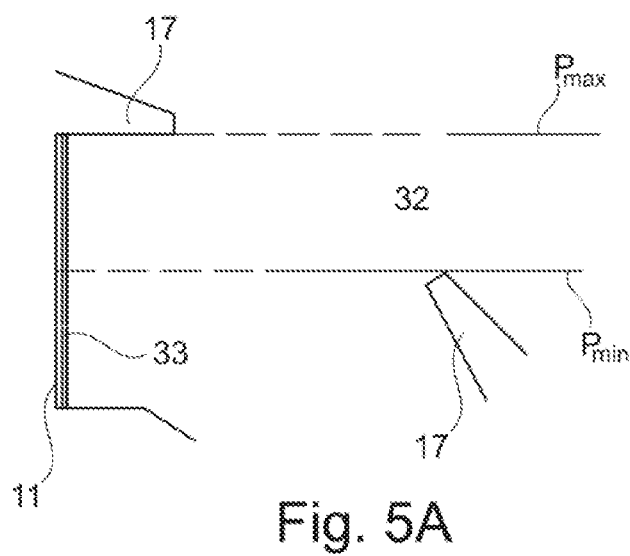

FIG. 5A shows, by planes $P_{max}$ and $P_{min}$, the gap available for the winding of the tooth by winding at least one conductor wire around the tooth. This gap axially delimits a portion 32 of the tooth 11 which will be used for the winding of the first partial winding 20a.

To produce this winding, the so-called "fly winding" technique may be used, consisting in employing a mobile arm rotating around the tooth.

A slip sheet 33, for example made of PTFE, may be arranged around the tooth 11, if necessary, as illustrated in FIG. 5A. This sheet is not represented in the other figures.

FIG. 5B shows the tooth 11 after the production of the first partial winding 20a, between the planes $P_{max}$ and $P_{min}$. This first partial winding 20a may have an ordered winding, with a conductor wire of circular or non-circular section, for example square or rectangular.

Once the partial winding 20a has been produced, it is moved along the tooth 11 towards the base thereof, until it abuts against the partition 16.

This movement may be effected for example using an element introduced before the winding under the pole shoe 17 or using a jaw which grasps the partial winding and drives it towards the base of the tooth.

Figure 5D:
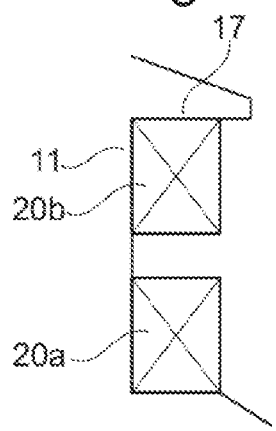

Once the partial winding 20a is at the bottom of the notch, as illustrated in FIG. 5C, it is possible to proceed with the winding of the second partial winding 20b at the same point on the tooth 11 as the first partial winding 20a, as illustrated in FIG. 5D.

Next, the spacer or spacers 25 may be put in place, followed by the sinks 30, to obtain the arrangement illustrated in FIG. 3.

The number of turns of a partial winding ranges for example from 10 to 200. The copper diameter of the wire ranges for example from 0.315 mm to 1.6 mm. Obviously, the invention is not limited to the example illustrated.

What has just been described with reference to the figures applies to the winding of a stator armature.

Moreover, it is possible to arrange more than two partial windings on each tooth, or to give the core other forms, with, for example, pole shoes having different dimensions from one tooth to another.

It is possible to produce the partial windings over a height less than the width of the winding window given by the planes $P_{max}$ and $P_{min}$, for example because the inner face 19 of the pole shoes is no longer planar and at right angles to the radial axis X of the tooth but concave towards the axis of rotation, so as to form, for example, cooling channels, or, if so desired, several inter-winding channels.

The partial windings may be of unequal heights, if necessary, in the case of stators in particular.

The teeth may be given a helical form, to reduce torque ripples.

The invention claimed is:

1. A method for manufacturing a wound rotor or stator, the rotor having more than four poles and/or the stator having more than four poles, the rotor or stator comprising teeth provided with pole shoes, the method comprising the following steps, for each pole:
   a) producing a partial winding by winding at least one conductor over the portion of the tooth of this pole extending axially along this pole between the pole shoes of this pole and a plane wherein the plane is oriented at right angles to the radial axis of the pole and tangential to a pole shoe of an adjacent pole, b) pushing back the duly produced partial winding towards the base of the tooth, and freeing said portion of the tooth having been used for the winding, c) repeating the step a) to produce another partial winding on the duly released portion of tooth.

2. The method according to claim 1, comprising the placing of a spacer between the partial windings of one and the same pole.

3. The method according to claim 1, the rotor or stator having six poles.

4. The method according to claim 1, the rotor or stator being wound pole after pole.

5. The method according to claim 1, each pole comprising only two partial windings.

6. A rotor or stator of a rotating electrical machine with four or more poles, formed by the method of claim 1, comprising:
   teeth provided with pole shoes, at least two partial windings arranged in the extension of one another on each tooth.

7. The rotor or stator according to claim 6, having exactly six teeth.

8. The rotor or stator according to claims 6, comprising a spacer between the two partial windings.

9. The rotor or stator according to claim 8, the spacer being passed through by at least one ventilation channel.

10. The rotor or stator according to claims 6, the partial windings being linked electrically in series.

11. The rotor or stator according to claims 6, a sheet of a material with a low friction coefficient being interposed between the partial windings and the corresponding tooth.

12. The rotor or stator according to claim 6, each pole having exactly two partial windings.

* * * * *